United States Patent [19]

Barcikowski

[11] Patent Number: 5,900,307
[45] Date of Patent: May 4, 1999

[54] SELF-LAMINATING SYSTEM FOR FORMING LUGGAGE TAGS

[75] Inventor: John C. Barcikowski, Chatsworth, Calif.

[73] Assignee: Innovation Specialties, Inc., Culver City, Calif.

[21] Appl. No.: 08/623,699

[22] Filed: Apr. 15, 1996

[51] Int. Cl.[6] .................................................. B32B 3/02
[52] U.S. Cl. .............................. 428/203; 40/299; 40/360; 40/662; 40/663; 283/74; 283/75; 283/77; 283/80; 283/109; 428/42.3; 428/136; 428/192
[58] Field of Search ................................ 428/40.1, 41.7, 428/41.8, 42.3, 43, 203, 136, 192; 40/299, 360, 662, 663; 283/74, 75, 77, 80, 109

[56] References Cited

U.S. PATENT DOCUMENTS

| | | | |
|---|---|---|---|
| 3,153,868 | 10/1964 | Jones | 428/41.8 |
| 3,582,439 | 6/1971 | Thomas | 235/488 |
| 3,616,121 | 10/1971 | Freundlich | 283/77 |
| 3,674,622 | 7/1972 | Plasse | 430/10 |
| 3,794,550 | 2/1974 | Taillie | 281/21.1 |
| 4,322,461 | 3/1982 | Raphael | 428/203 |
| 4,575,127 | 3/1986 | Michel | 428/203 |
| 4,907,359 | 3/1990 | Berman | 40/299 |

*Primary Examiner*—Nasser Ahmad
*Attorney, Agent, or Firm*—Thomas I. Rozsa; Tony D. Chen; Jerry Fong

[57] ABSTRACT

A self-laminating system for sealing a business card or the like to a luggage tag. The self laminating system comprises a rigid backing, a flexible transparent sheet with a layer of pressure sensitive adhesive material thereon and a removable cover liner which covers the entire area of the pressure sensitive adhesive material. The cover liner has a pre-cut crease which separates it into an upper portion and a lower portion, where the upper portion is pre-removed such that an exposed area of the pressure sensitive adhesive material on the flexible transparent sheet is affixed to the rigid backing. The card is placed between the rigid backing and the transparent sheet such that the lower portion of the cover liner is peeled off which exposes the rest of the pressure adhesive material so that the flexible transparent sheet can be securely affixed to the business card and the periphery of the rigid backing.

11 Claims, 2 Drawing Sheets

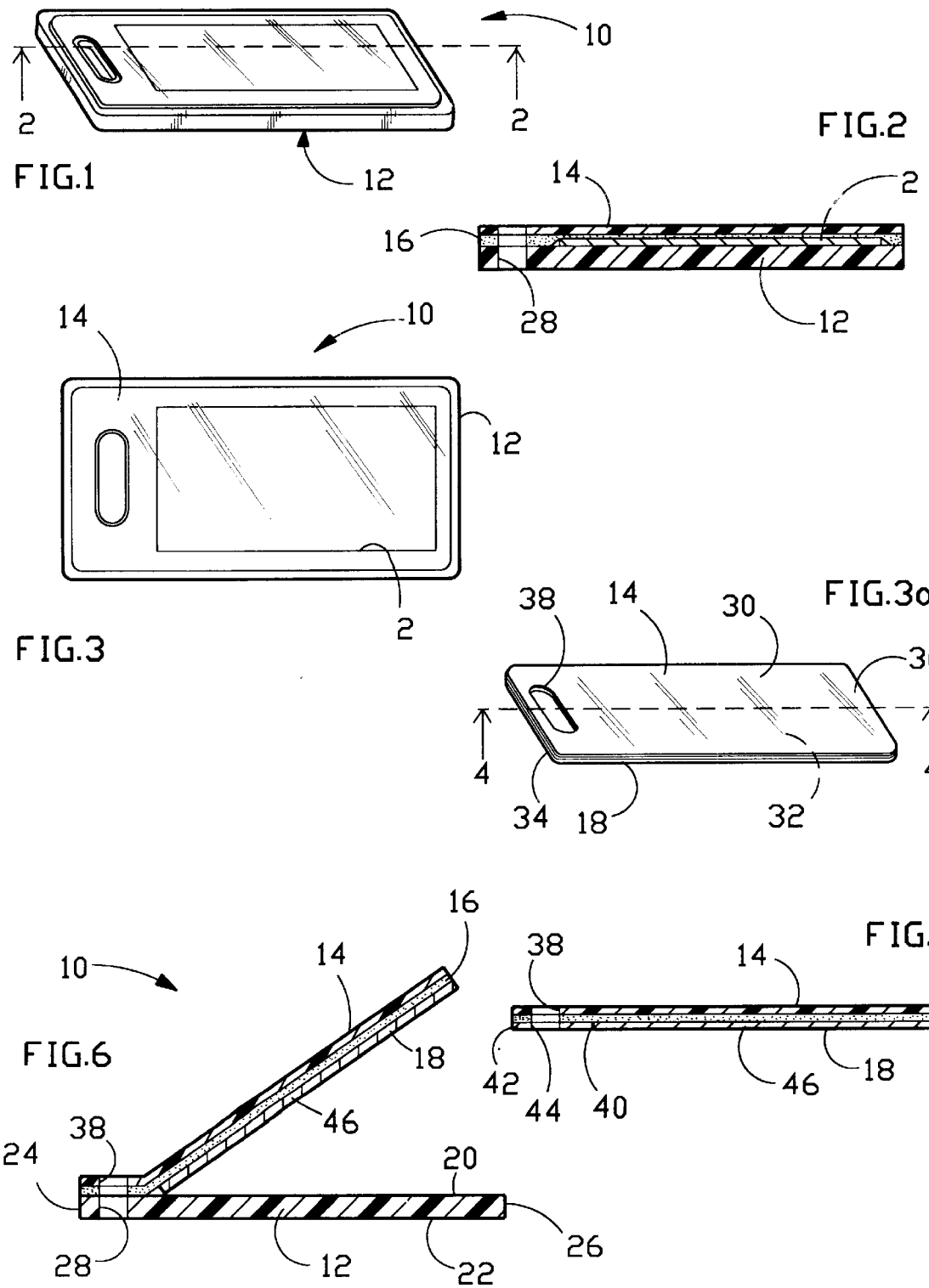

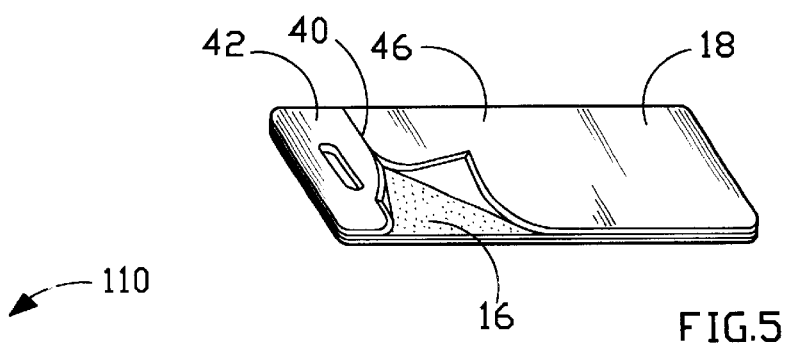
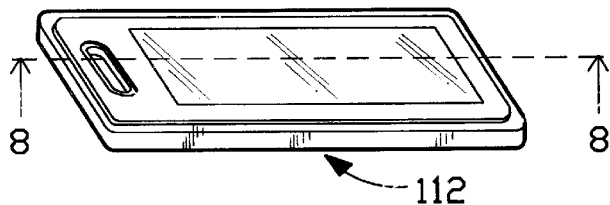
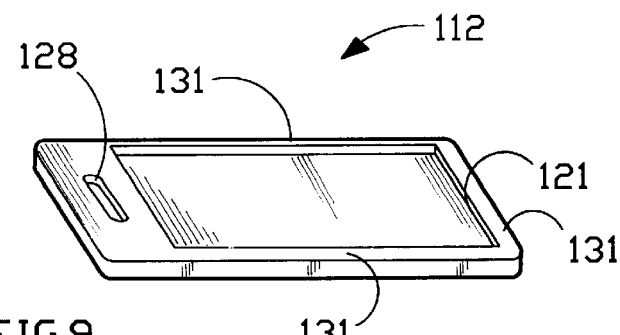
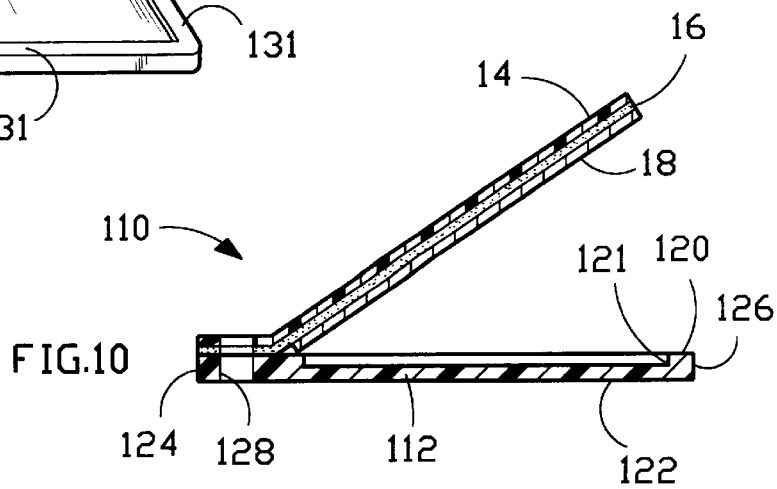

SELF-LAMINATING SYSTEM FOR FORMING LUGGAGE TAGS

BACKGROUND OF THE INVENTION

1. Field of the Invention

The present invention generally relates to the field of luggage tags. More particularly, the present invention relates to the field of self-laminating devices for forming luggage tags.

2. Description of the Prior Art

Luggage tags have been known in the prior art for many years. The prior art luggage tag comprises a pocket which has an open end for inserting and retaining a card with identifying information thereon. The pocket has transparent sides for viewing the card. The inherent disadvantage with this is that the card with the identifying information is overlaid by a pouch and not affixed to the pouch walls so that it is removable, thereby permitting one to open the pouch and tamper with the card with the identifying information to provide a false information card.

Another application is to have two transparent sheets which seal the card. Each sheet has a bonding surface which is heat-activated. The card with the identifying information is placed between the transparent sheets and sealed therein by a special machine. The disadvantage with this is that a special machine is required for sealing the two transparent sheets.

The following four (4) prior art patents were uncovered in the pertinent field of the present invention:

1. U.S. Pat. No. 3,582,439 issued to Thomas on Jun. 1, 1971 for "ID Card Laminar Structures And Processes Of Making Same" (hereafter "the Thomas Patent");
2. U.S. Pat. No. 3,616,121 issued to Freundlich on Oct. 26, 1971 for "Composite Identification Card" (hereafter "the Freundlich Patent");
3. U.S. Pat. No. 3,674,622 issued to Plasse on Jul. 4, 1972 for "Novel Laminating Media" (hereafter "the Plasse Patent"); and
4. U.S. Pat. No. 3,794,550 issued to Taillie on Feb. 26, 1974 for "Sheet Binding" (hereafter "the Taillie Patent").

The Thomas Patent discloses an ID card laminar structure and processes of making same. A print is completely enclosed by two sheets of vinyl sealed together along their periphery and having the surface of the print securely laminated to the inner surface of one of the vinyl sheets.

The Freundlich Patent discloses a composite identification card. It comprises two sheets bonded together to form a pouch-like member which contains a pocket sealed on three sides and opened on a fourth side for inserting or removing a member from the pocket of the pouch.

The Plasse Patent discloses a laminating medium. It comprises a substrate which is prepared by applying a pressure sensitive adhesive coating to one surface of a polyvinyl chloride sheet material. A sheet of polyurethane foam is laminated to the adhesive layer of the polyvinyl chloride substrate. A coating of a pressure-sensitive adhesive is then applied to the polyurethane layer to provide a laminating medium. The sandwich structure is then sealed.

The Taillie Patent discloses a sheet binding. It is a method for binding two or more indicia bearing sheets together by providing on the sheets additional minor high density areas of the same indicia imparting material in areas of desired binding. The sheets are subsequently stacked and the additional indicia imparting material commonly fused between adjacent sheets at the binding areas to fasten the sheets together.

It is desirable to have a very efficient and also very effective design and construction of a self-laminating system wherein a luggage tag, an ID tag, etc. can be formed without the need of special machines.

SUMMARY OF THE INVENTION

The present invention is a novel and unique self-laminating system, where a business card or the like can be sealed to a luggage tag. The self laminating system comprises a rigid backing, a flexible transparent sheet with a layer of pressure sensitive adhesive (PSA) material thereon and a removable cover liner which covers the entire area of the PSA material. The cover liner has a pre-cut crease which separates it into two portions, where one of the two portions is pre-removed such that an exposed area of the PSA material is affixed to the rigid backing. To form the luggage tag, a business card or the like is placed between the rigid backing and the transparent sheet. The other one of the two portions of the cover liner is peeled off which exposes the rest of the PSA material so that the transparent sheet can be securely affixed to the business card and the periphery of the rigid backing.

It has been discovered, according to the present invention, that by providing a self-laminating system for sealing a business card or the like, then an identifying luggage tag can be formed.

It has additionally been discovered, according to the present invention, that by providing a self-laminating system which comprises a rigid backing, a transparent sheet with a layer of PSA material and a cover liner which covers the PSA material, then a business card or the like can be placed on the rigid backing, and then the cover liner is peeled off from the PSA material so that the cover liner adheres to the business card and sandwiches the business card between the cover liner and the rigid backing to seal the business card therebetween.

It has further been discovered, according to the present invention, that by providing a rigid backing with a recess, then a business card or the like can be positioned within the recess on the rigid backing and sealed therein by a transparent sheet with the PSA material.

It is therefore an object of the present invention to provide a self-laminating system, where a business card or the like can be sealed, thereby forming an identifying luggage tag.

It is an additional object of the present invention to provide a self-laminating system which comprises a rigid backing, a transparent sheet with a layer of PSA material and a cover liner which covers the PSA material. A business card or the like can be placed on the rigid backing, where the cover liner is peeled off from the PSA material which adheres to the business card and sandwiches the business card between the cover liner and the rigid backing to seal the business card therebetween.

It is a further object of the present invention to provide a rigid backing with a recess, where a business card or the like can be positioned within the recess on the rigid backing and sealed therein by a transparent sheet with the PSA material.

In the preferred embodiment of the present invention, the self-laminating system comprises a flat rigid backing, a flexible transparent sheet, a layer of PSA material permanently affixed to the transparent sheet and a removable cover liner which covers the entire area of the PSA material.

In an alternative embodiment of the present invention, the self-laminating system comprises a rigid backing with a recess, a flexible transparent sheet, a layer of PSA material permanently affixed to the transparent sheet and a removable cover liner which covers the entire area of the PSA material.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated:

FIG. 1 is a perspective view of the preferred embodiment of the present invention self-laminating system;

FIG. 2 is a cross-sectional view taken along line 2—2 of FIG. 1;

FIG. 3 is a front elevational view of the present invention self-laminating system;

FIG. 3a is a perspective view of a flexible transparent sheet of the present invention self-laminating system;

FIG. 4 is a cross-sectional view taken along line 4—4 of FIG. 3a;

FIG. 5 is a perspective view of a removable cover liner which covers the entire area of a pressure sensitive adhesive material, showing the cover liner being partially peeled off;

FIG. 6 is a cross-sectional view of the present invention self-laminating system, showing the self-laminating system in the unsealed condition;

FIG. 7 is a perspective view of an alternative embodiment of the present invention self-laminating system;

FIG. 8 is a cross-sectional view taken along line 8—8 of FIG. 7;

FIG. 9 is a perspective view of a rigid backing of the present invention self-laminating system shown in FIG. 7; and FIG. 10 is a cross-sectional view of the present invention self-laminating system, showing the self-laminating system in the unsealed condition.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a self-laminating system for forming a luggage tag or the like and a method of making the same.

Referring to FIG. 1, there is shown at 10 a perspective view of the preferred embodiment of the present invention self-laminating system for forming a luggage tag. A business card or the like 2 is laminated thereon.

Referring to FIGS. 2, 3 and 5, there is shown in FIG. 2 respective cross sectional views of the present invention self-laminating system which comprises a luggage tag 12, a flexible transparent sheet 14, a layer of pressure sensitive adhesive (PSA) material 16 and a removable cover liner 18 (see FIG. 5). Referring to FIG. 6, the luggage tag 12 is generally an elongated rectangular shaped flat rigid backing which has a front side 20, a back side 22, a top end 24, a bottom end 26, and a central slotted aperture 28 therethrough which is located adjacent to the top end 24. The rigid backing 12 is approximately in the range of 30–40 mil thick.

Referring to FIGS. 3a and 4, there is shown the flexible transparent sheet 14 which is generally an elongated rectangular shaped thin body. The transparent sheet 14 has a front side 30, a back side 32, a top end 34, a bottom end 36, and a central slotted aperture 38 therethrough and located adjacent to the top end 34. The transparent sheet 14 has a length and a width, which are slightly smaller than the rigid backing 12.

Referring to FIGS. 4 and 5, the layer of PSA material 16 is permanently affixed to the back side 32 of the flexible transparent sheet 14. The removable cover liner 18 removably covers the entire layer of PSA material 16. The cover liner 18 is conventional in the art and has a wax surface which is attached to the PSA material. There is a pre-cut crease 40 which separates the removable cover liner 18 into two portions, a small top portion 42 with a central slotted aperture 44 and a large bottom portion 46. The top portion 42 is pre-removed so that an exposed area of the layer of PSA material 16 is pre-affixed to the front side 20 of the rigid backing 12, where the central slotted aperture 44 on the top portion 42 is aligned with the central slotted aperture 28 of the rigid backing 12. The pre-cut crease 40 is known in the art as a kiss-cut scoring. These slotted apertures 28 and 38 of the rigid backing 12 and the removable cover liner 14 respectively allow a strap (not shown) to be inserted therethrough for latching to a luggage case or etc.

Referring to FIGS. 2, 5 and 6, the business card or the like 2 is placed on the front side 20 of the luggage case 12. The bottom portion 46 of the removable cover paper 18 is peeled off which exposes the rest of PSA material 16 such that the flexible transparent sheet 14 is pressed onto the business card 2 and a periphery portion on the front side 20 of the rigid backing 12 and secured thereon.

Referring to FIG. 7, there is shown at 110 a perspective view of an alternative embodiment of the present invention self-laminating system for forming a luggage tag. A business card or the like 2 is laminated thereon. Since it assembles and functions the same as previously described above except that a new luggage tag 112 is substituted for the old luggage tag 12 shown in FIGS. 1, 2 and 6, the parts are numbered correspondingly with 100 added to each reference number. The self-laminating system 110 comprises a luggage tag 112, a flexible transparent sheet 14, a layer of PSA material 16 and a removable cover liner 18 (see FIGS. 3, 4 and 5). The flexible transparent sheet 14, the layer of PSA material 16 and the removable cover liner 18 are identical to that in the preceding embodiment just discussed above, and the description thereof will not be repeated.

Referring to FIGS. 8, 9 and 10, there is shown the present invention self-laminating system 110. The luggage tag 112 is generally an elongated rectangular shaped rigid backing which has a front side 120, a back side 122, a top end 124, a bottom end 126, a central slotted aperture 128 therethrough which is located adjacent to the top end 124, and a recess 121 located on the front side 120. The rigid backing 112 is approximately 30–40 mil thick.

The business card or the like 2 is installed and positioned within the recess 121 at the front side 120 of the luggage tag 112 such that it is flush with the upper surface of the front side 120. The bottom portion 46 of the removable cover paper 18 is peeled off which exposes the rest of PSA material 16 such that the flexible transparent sheet 14 is pressed onto the business card 2 and a periphery portion 131 on the front side 20 of the rigid backing 12 and secured thereon. In the alternative embodiment, the business card 2 is housed within the recess 121 whereas in the prior embodiment, the business card rests on top surface 20 of rigid backing 12.

The present invention conforms to conventional forms of manufacture or any other conventional way known to one skilled in the art. The present invention can be made from several materials. The manufacturing process which could accommodate the construction of the present invention may be injection, thermoform, etc. or other molding process. By way of example, the rigid backing can be made of plastic material while the transparent sheet can be made of polyester material.

Defined in detail, the present invention is a self-laminating system for forming a luggage tag and used in conjunction with a business card or the like, the system comprising: (a) a generally rectangular shaped rigid backing having a front side, a back side, a top end, a bottom end, and a slotted aperture therethrough located adjacent to the top end; (b) a generally rectangular shaped thin flexible transparent sheet having a front side, a back side, a top end, a bottom end, and a slotted aperture therethrough located adjacent to the top end and aligned with the slotted aperture of the rigid backing, the transparent sheet having a length and a width slightly smaller than the rigid backing; (c) a layer of pressure sensitive adhesive material permanently affixed to the back side of the flexible transparent sheet; and (d) a removable cover liner removably and completely covering the layer of pressure sensitive adhesive material, the cover liner having a pre-cut crease separating a small upper portion and a large lower portion, where the upper portion is pre-removed such that an exposed area of the layer of pressure sensitive adhesive material on said flexible transparent sheet is pre-affixed to the front side of the rigid backing, the slotted aperture on the flexible transparent sheet aligned with the slotted aperture of the rigid backing; (e) whereby the business card or the like can be placed on the front side of the rigid backing, and when the large lower portion of the removable cover liner is peeled off which exposes the rest of the layer of pressure adhesive material, the flexible transparent sheet can be securely affixed on the business card and the front side of the rigid backing, thereby forming the luggage tag.

Defined broadly, the present invention is a cold-laminating system for forming a luggage tag and used in conjunction with a business card or the like, the system comprising: (a) a rigid backing having a front side, a back side, and an aperture; (b) a flexible transparent sheet having a front side, a back side, and an aperture; (c) a layer of pressure sensitive adhesive material permanently affixed to the back side of the flexible transparent sheet; and (d) a cover liner removably and completely covering the layer of pressure sensitive adhesive material, the cover liner having a pre-cut crease separating an upper portion and a lower portion, where the upper portion is pre-removed such that an exposed area of the layer of pressure sensitive adhesive material on said flexible transparent sheet is pre-affixed to the front side of the rigid backing, where the aperture on the upper portion of the flexible transparent sheet is aligned with the aperture on the rigid backing; (e) whereby the business card or the like can be placed on the front side of the rigid backing, and when the lower portion of the cover liner is peeled off which exposes the rest of the layer of pressure adhesive material, the flexible transparent sheet can be securely affixed on the business card and the front side of the rigid backing, thereby forming the luggage tag.

Defined alternatively broadly, the present invention is a self-laminating system for forming a luggage tag and used in conjunction with a business card or the like, the system comprising: (a) a rigid backing having a front side, a back side, an aperture, and a recess located on the front side; (b) a flexible transparent sheet having a front side, a back side, and an aperture; (c) a layer of pressure sensitive adhesive material permanently affixed to the back side of the flexible transparent sheet; and (d) a cover liner removably and completely covering the layer of pressure sensitive adhesive material, the cover liner having a pre-cut crease separating an upper portion and a lower portion, where the upper portion is pre-removed such that an exposed area of the layer of pressure sensitive adhesive material on said flexible transparent sheet is pre-affixed to the front side of the rigid backing, the aperture on the upper portion of the flexible transparent sheet aligned with the aperture on the rigid backing; (e) whereby the business card or the like can be placed within the recess on the rigid backing, and when the lower portion of the cover liner is peeled off which exposes the rest of the layer of pressure adhesive material, the flexible transparent sheet can be securely affixed on the business card and the front side of the rigid backing, thereby forming the luggage tag.

Defined more broadly, the present invention is a laminating system for forming a luggage tag and used in conjunction with a business card or the like, the system comprising: (a) a backing member; (b) a sheet member having a pressure sensitive adhesive material thereon; and (c) a liner member removably covering the pressure sensitive adhesive material; (d) whereby the business card or the like can be placed on the backing member, and when the liner member is peeled off which exposes the pressure adhesive material, the sheet member can be securely affixed on the business card and the backing member, thereby forming the luggage tag.

Defined also alternatively broadly, the present invention is a method for making a self-laminating luggage tag and used in conjunction with a business card or the like, the method comprising the steps of: (a) providing a rigid backing having a front side, a back side, and an aperture; (b) providing a flexible transparent sheet having a front side, a back side, and an aperture; (c) permanently affixing a layer of pressure sensitive adhesive material to the back side of the flexible transparent sheet; and (d) providing a cover liner; (e) removably and completely covering the layer of pressure sensitive adhesive material with the cover liner; (f) kiss-cut scoring the cover liner which separates an upper portion with an aperture and a lower portion; (g) pre-removing the upper portion of the cover liner such that an exposed area of the layer of pressure sensitive adhesive material on said flexible transparent sheet is pre-affixed to the front side of the rigid backing, where the aperture on the flexible transparent sheet is aligned with the aperture on the rigid backing; (h) whereby the business card or the like can be placed on the front side of the rigid backing, and when the lower portion of the cover liner is peeled off which exposes the rest of the layer of pressure adhesive material, the flexible transparent sheet can be securely affixed on the business card and the front side of the rigid backing, thereby forming the luggage tag.

Defined further alternatively broadly, the present invention is a method for forming a self-laminating luggage tag and used in conjunction with a business card or the like, the method comprising the steps of: (a) providing a rigid backing having a front side, a back side, an aperture, and a recess located on the front side; (b) providing a flexible transparent sheet having a front side, a back side, and an aperture; (c)

permanently affixing a layer of pressure sensitive adhesive material to the back side of the flexible transparent sheet; and (d) providing a cover liner; (e) removably covering the layer of pressure sensitive adhesive material with the cover liner; (f) kiss-cut scoring the cover liner which separates an upper portion with an aperture and a lower portion; (g) pre-removing the upper portion of the cover liner such that an exposed area of the layer of pressure sensitive adhesive material or said flexible transparent sheet is pre-affixed to the front side of the rigid backing, where the aperture on the flexible transparent sheet is aligned with the aperture on the rigid backing; (e) whereby the business card or the like can be placed within the recess on the rigid backing, and when the lower portion of the cover liner is peeled off which exposes the rest of the layer of pressure adhesive material, the flexible transparent sheet can be securely affixed on the business card and the front side of the rigid backing, thereby forming the luggage tag.

Defined also alternatively more broadly, the present invention is a method for making a self-laminating luggage tag and used in conjunction with a business card or the like, the method comprising the steps of: (a) providing a backing member; (b) providing a sheet member having a pressure sensitive adhesive material thereon; (c) providing a liner member; and (d) removably covering the pressure sensitive adhesive material with the liner member; (e) whereby the business card or the like can be placed on the backing member, and when the liner member is peeled off which exposes the pressure adhesive material, the sheet member can be securely affixed on the business card and the backing member, thereby forming the luggage tag.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. A self-laminating system for forming a luggage tag, the system comprising:
   a. a generally rectangular shaped rigid backing having a front side, a back side, a top end, a bottom end, and a slotted aperture therethrough located adjacent to the top end;
   b. a generally rectangular shaped thin flexible transparent sheet having a front side, a back side, a top end, a bottom end, and a slotted aperture therethrough located adjacent to the top end and aligned with said slotted aperture of said rigid backing, the transparent sheet having a length and a width smaller than said rigid backing;
   c. a layer of pressure sensitive adhesive material permanently affixed to said back side of said flexible transparent sheet; and
   d. a business card positioned and placed on said front side of said rigid backing such that said flexible transparent sheet is securely affixed on said business card and said front side of said rigid backing by said layer of pressure adhesive material.

2. The self-laminating system in accordance with claim 1 wherein said rigid backing is made of plastic material.

3. The self-laminating system in accordance with claim 1 wherein said transparent sheet is made of polyester material.

4. A cold-laminating system for forming a luggage tag, the system comprising:
   a. a rigid backing having a front side, a back side, and an aperture;
   b. a flexible transparent sheet having a front side, a back side, and an aperture;
   c. a layer of pressure sensitive adhesive material permanently affixed to said back side of said flexible transparent sheet; and
   d. a business card positioned and placed on said front side of said rigid backing such that said flexible transparent sheet is securely affixed on said business card and said front side of said rigid backing by said layer of pressure adhesive material.

5. The cold-laminating system in accordance with claim 4 wherein said rigid backing is made of plastic material.

6. The cold-laminating system in accordance with claim 4 wherein said flexible transparent sheet is made of polyester material.

7. The cold-laminating system in accordance with claim 4 wherein said flexible transparent sheet having a length and a width smaller than said rigid backing.

8. A self-laminating system for forming a luggage tag, the system comprising:
   a. a rigid backing having a front side, a back side, an aperture, and a recess located on the front side;
   b. a flexible transparent sheet having a front side, a back side, and an aperture;
   c. a layer of pressure sensitive adhesive material permanently affixed to said back side of said flexible transparent sheet; and
   d. a business card positioned and placed within said recess on said rigid backing such that said flexible transparent sheet is securely affixed on said business card and said front side of said rigid backing by said layer of pressure adhesive material.

9. The self-laminating system in accordance with claim 8 wherein said rigid backing is made of plastic material.

10. The self-laminating system in accordance with claim 8 wherein said flexible transparent sheet is made of polyester material.

11. The self-laminating system in accordance with claim 8 wherein said flexible transparent sheet having a length and a width smaller than said rigid backing.

* * * * *